Aug. 28, 1928.
A. L. CLARK, JR
1,682,035
PLOTTING INSTRUMENT
Filed June 13, 1923
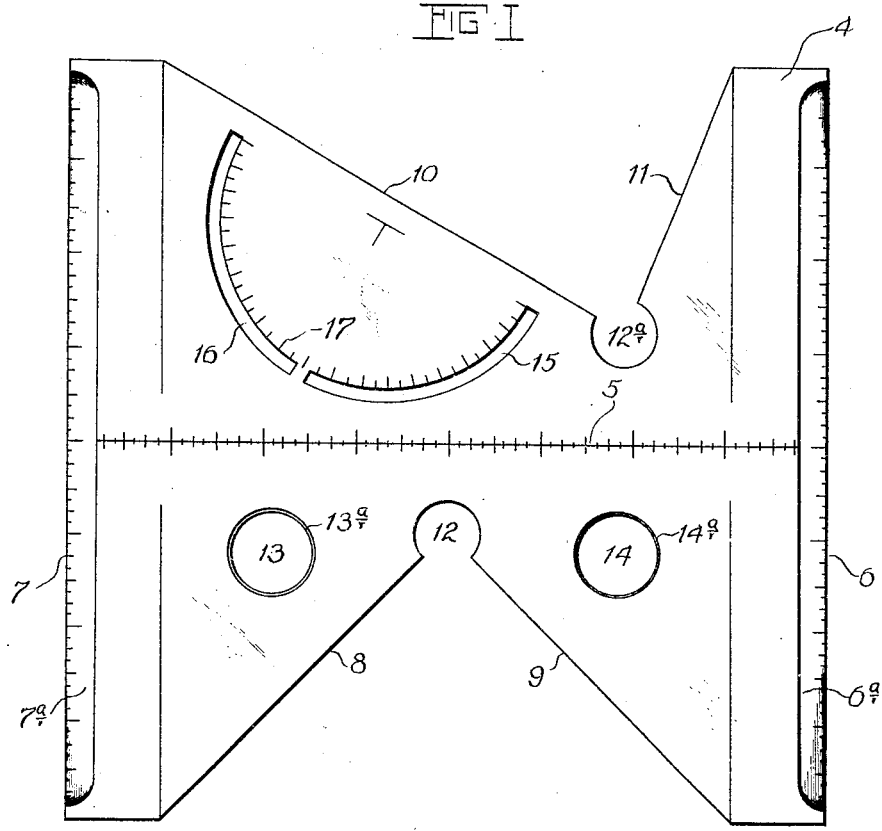
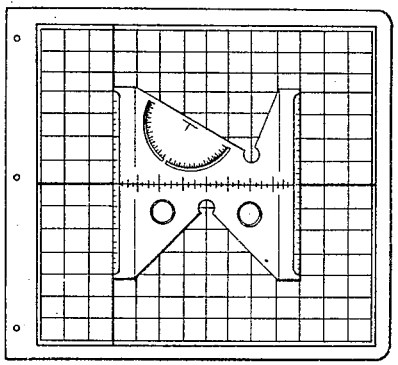
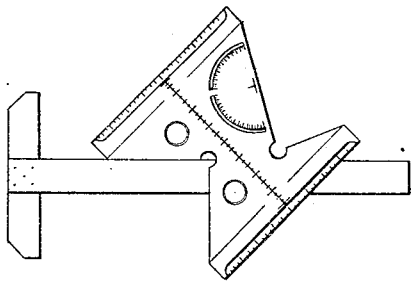
INVENTOR
Albert Loring Clark Jr.
BY Fred Gulach
HIS ATTORNEY Patented Aug. 28, 1928.

1,682,035

UNITED STATES PATENT OFFICE.

ALBERT LORING CLARK, JR., OF ANN ARBOR, MICHIGAN.

PLOTTING INSTRUMENT.

Application filed June 13, 1923. Serial No. 645,035.

The invention relates to plotting instruments. The object of the invention is to lessen the time required and increase the accuracy in plotting points relatively to any given reference lines or planes. This object is attained by providing an instrument by which distances from three reference lines may be plotted by a single position of the instrument, as in plotting points in coordinate systems and by which through a change in the instrument's position points in oblique and isometric projection as well as orthographic projections may be plotted. The instrument also embodies means to measure angles as well as distances. The invention consists in the several novel features hereinafter set forth and more particularly defined by claims at the conclusion hereof.

In the drawings, Fig. 1 is a plan view of an instrument embodying the invention. Fig. 2 is a plan showing the instrument in use with a pair of coordinate axes. Fig. 3 is a plan view of the instrument in conjunction with a T-square, showing how the instrument may be used in plotting points with reference to angular reference lines such as Cartesian coordinates.

The invention is exemplified in an instrument made of a substantially flat plate 4 of celluloid or any other suitable transparent and flexible material and which is provided with a scale 5 to measure the abscissa of a point with regard to coordinate axes or a horizontal distance from a line of reference. Scales 6 and 7 are provided on opposite parallel margins $6^a$ and $7^a$ of the plate and are perpendicular to scale 5 and are used to measure a vertical distance or the ordinate of a point with regard to coordinate axes. Scales 6 and 7 are marked on the underside of the blade and bevelled margins $6^a$ and $7^a$ are provided over said scales to prevent the refraction of light which might be detrimental in the use of the instrument. The plate is provided with edges 8, 9, 10, and 11 which extend inwardly from the ends of the parallel margins $6^a$ and $7^a$ respectively and at different angles with respect to scale 5 and which are used to retain the instrument in angular positions for use in plotting points with regard to Cartesian coordinates or oblique or isometric projections as exemplified in Fig. 3. Cut-aways or notches 12 and $12^a$ adjacent the apexes of the edges 8 and 9, and 10 and 11 respectively are provided so as to facilitate the flexing of the instrument when used in an angular position in conjunction with a T-square as is shown in Fig. 3. Holes 13 and 14 with edges $13^a$ and $14^a$ respectively which are bevelled from both sides are provided for convenience in grasping the instrument. Quadrant slots 15 and 16 are formed in the blade and together with scale 17 form a protractor for use in measuring angles.

The invention is not to be understood as restricted to the details set forth and may be modified within the scope of the appended claims, without departing from the spirit and scope of the invention.

What I claim as new and desire to secure by Letters Patent is:

1. A plotting instrument comprising a polygonal plate made of flexible material, the sides of the plate having parallel edges, scales on the plate adjacent said edges, and a scale extending between and at right angles to said scales, one end of the plate having two reentrant and converging edges adjoining each other and extending at acute angles to said scales, said plate being adapted to be flexed and positioned so that a portion thereof containing one of said reentrant edges will overlie an additional instrument and the edge adjoining said one edge will engage an edge of the additional instrument to angularly position the side edges of the plate parallel to a line of reference so that parallel and perpendicular distances relatively to said reference line may be simultaneously measured by means of the scales.

2. A plotting instrument comprising a polygonal plate made of flexible material, the sides of the plate having parallel edges, scales on the plate adjacent said edges, and a scale extending across the central portion of the plate and at right angles to said scales, the ends of the plate having each two reentrant and converging edges adjoining each other and extending at acute angles to said scales, said plate being adapted to be flexed and positioned so that a portion thereof containing one of said reentrant edges will overlie an additional instrument and the edge adjoining said one edge will engage an edge of the additional instrument to angularly position the side edges of the plate parallel to a line of reference so that parallel and perpendicular distances relatively to said reference line may be simultaneously measured by means of the scales.

ALBERT LORING CLARK, Jr.